(12) United States Patent
Schilling et al.

(10) Patent No.: US 7,738,173 B2
(45) Date of Patent: Jun. 15, 2010

(54) OPTICAL SAFETY ELEMENT AND SYSTEM FOR VISUALISING HIDDEN INFORMATION

(75) Inventors: Andreas Schilling, Hagendorn (CH); Wayne Robert Tompkin, Baden (CH); René Staub, Hagendorn (CH)

(73) Assignee: OVD Kinegram AG, Zug (CH)

(*) Notice: Subject to any disclaimer, the term of this patent is extended or adjusted under 35 U.S.C. 154(b) by 604 days.

(21) Appl. No.: 10/562,330

(22) PCT Filed: Jun. 16, 2004

(86) PCT No.: PCT/EP2004/006466

§ 371 (c)(1),
(2), (4) Date: Dec. 23, 2005

(87) PCT Pub. No.: WO2004/113953

PCT Pub. Date: Dec. 29, 2004

(65) Prior Publication Data

US 2006/0274392 A1 Dec. 7, 2006

(30) Foreign Application Priority Data

Jun. 25, 2003 (DE) ................................ 103 28 759

(51) Int. Cl.
*G02B 5/18* (2006.01)

(52) U.S. Cl. ...................... 359/573; 359/567; 359/569; 359/574

(58) Field of Classification Search ................. 359/569, 359/567, 573–575
See application file for complete search history.

(56) References Cited

U.S. PATENT DOCUMENTS 5,032,003 A * 7/1991 Antes .......................... 359/567

(Continued)

FOREIGN PATENT DOCUMENTS

DE 195 16 741 A1 7/1996

(Continued)

OTHER PUBLICATIONS

Isaac Amidror and Rogert D. Hersch: "Fourier-based analysis and synthesis of moires in the superposition of geometrically transformed periodic structures", Journal of the Optical Society of America A/vol. 15, No. 5, published May 1998.

(Continued)

*Primary Examiner*—Joshua L Pritchett
(74) *Attorney, Agent, or Firm*—Hoffmann & Baron, LLP

(57) ABSTRACT

The invention concerns an optical security element and a system for visualising items of concealed information comprising such an optical security element. The optical security element has a substrate layer in which a relief structure defined by relief parameters, in particular relief shape, relief depth, spatial frequency and azimuth angle, is shaped in the surface region defined by an X-axis and a Y-axis, for producing an optically perceptible effect. One or more of the relief parameters defining the relief structure are varied in the surface region in accordance with a parameter variation function. The surface region is divided into one or more pattern regions and a background region. One or more of the relief parameters defining the relief structure are varied in the one or more pattern regions in accordance with a parameter variation function which is phase-displaced in relation to the parameter variation function of the background region. There is further provided a verification element which has a verification grating which is defined by a periodic transmission function and whose period corresponds to the period of the parameter variation function.

22 Claims, 12 Drawing Sheets

U.S. PATENT DOCUMENTS

| | | | |
|---|---|---|---|
| 5,969,863 A * | 10/1999 | Staub et al. | 359/567 |
| 5,999,280 A | 12/1999 | Huang | |
| 6,036,233 A | 3/2000 | Braun et al. | |
| 6,062,604 A | 5/2000 | Taylor et al. | |
| 6,088,161 A * | 7/2000 | Lee | 359/567 |
| 6,157,487 A * | 12/2000 | Staub et al. | 359/567 |
| 6,283,509 B1 | 9/2001 | Braun et al. | |
| 6,324,004 B1 | 11/2001 | Staub et al. | |
| 6,351,537 B1 | 2/2002 | Dovgodko et al. | |
| 6,369,919 B1 | 4/2002 | Drinkwater et al. | |
| 6,417,968 B1 * | 7/2002 | Staub et al. | 359/567 |
| 2001/0043396 A1 * | 11/2001 | Lee | 359/569 |

FOREIGN PATENT DOCUMENTS

| | | |
|---|---|---|
| DE | 195 16 741 A1 | 11/1996 |
| DE | 100 44 465 A1 | 3/2002 |
| EP | 0 520 363 A1 | 12/1992 |
| EP | 0 992 020 B1 | 4/2000 |
| EP | 1 102 208 A2 | 5/2001 |
| JP | 02-051315 | 4/1990 |
| JP | 06-067608 | 3/1994 |
| JP | 2003-72219 | 3/2003 |
| RU | 2161092 | 12/2000 |
| RU | 2172679 | 8/2001 |
| RU | 2201613 | 3/2003 |
| WO | WO9504948 A1 | 2/1995 |
| WO | WO 99/65699 | 12/1999 |
| WO | WO 01/80175 A1 | 10/2001 |
| WO | WO0200446 | 1/2002 |
| WO | WO 02/100653 A1 | 12/2002 |
| WO | WO 03/009225 A2 | 1/2003 |

OTHER PUBLICATIONS

Brockhaus "Physik ABC", vol. 2/Ma-Z, published 1989.
Japanese Office Action from Application No. 2006-515945, dated Dec. 15, 2009.

* cited by examiner

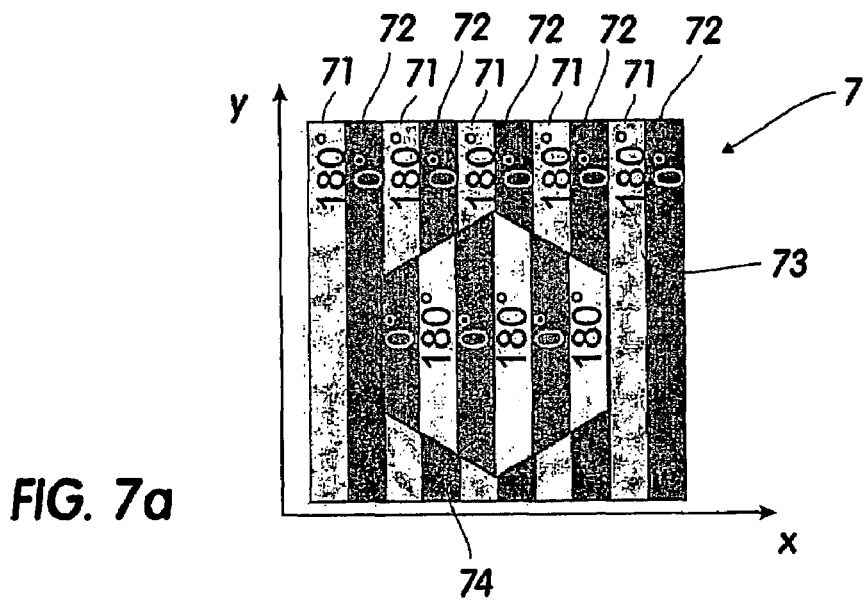
*FIG. 7a*
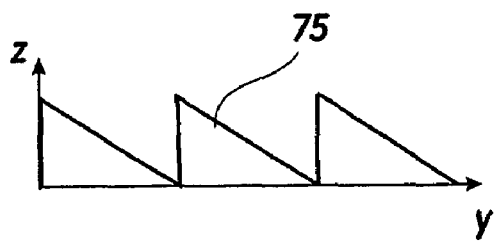
*FIG. 7b*
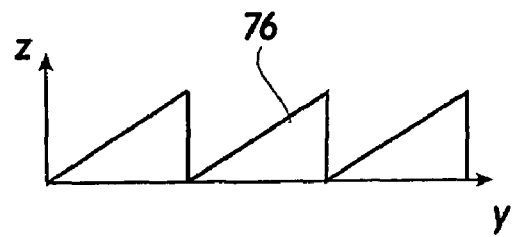
*FIG. 7c*
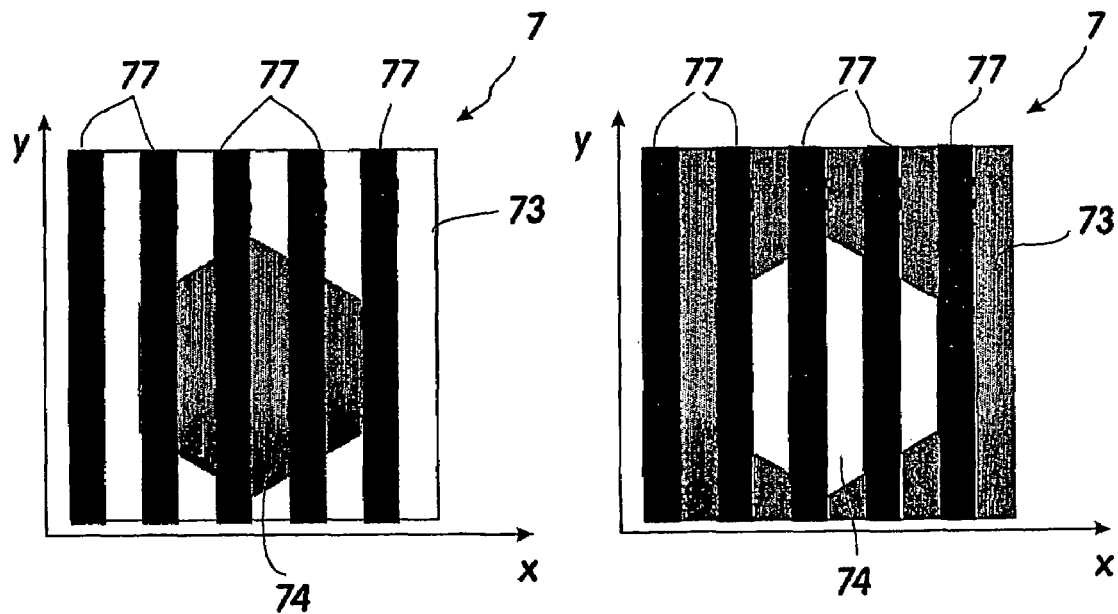
*FIG. 7d*     *FIG. 7e*

OPTICAL SAFETY ELEMENT AND SYSTEM FOR VISUALISING HIDDEN INFORMATION

CROSS-REFERENCE TO RELATED APPLICATIONS

This application is a National Phase application of International Application No. PCT/EP2004/006466 filed Jun. 16, 2004, which claims priority based on German Patent Application No. 103 28 759.0, filed Jun. 25, 2003, which are both incorporated herein by reference.

BACKGROUND OF THE INVENTION

The invention relates to an optical security element having a substrate layer in which a relief structure defined by relief parameters, in particular relief shape, relief depth, spatial frequency and azimuth angle, is shaped out in a surface region defined by an X-axis and a Y-axis, for producing an optically perceptible effect, and a system for visualising items of concealed information with such an optical security element.

The ever improving photocopying technology and the ongoing development of electronic scanning and printing apparatuses mean that there is an increasing need for optical security elements which are as forgery-proof as possible.

Now, U.S. Pat. No. 6,351,537 B1 describes an optical security element which combines a hologram and a concealed image to increase the level of copying security. The hologram used is a daylight hologram which is generated by an optical-diffraction structure shaped in a photopolymer film and is visible without the use of a monochromatic, coherent light source. The concealed image and the hologram are preferably arranged in adjacent relationship on a substrate. The concealed image is rendered visible by means of a decoding device. In that respect the decoding device used can be digital copiers or scanners but also transparent carriers on which a line grating with a line spacing corresponding to the desired scanning frequency is printed. In that case the concealed image is produced from a starting image by a procedure whereby firstly the frequency components of the starting image, which are greater than half the scanning frequency of the decoding device, are removed and the remaining frequency components are then mirrored at the frequency axis which corresponds to half the scanning frequency.

In that way the optical security element affords a first security feature, namely the hologram, and a second security feature, namely the concealed image. That enhances the level of safeguard against forgery.

U.S. Pat. No. 5,999,280 describes a holographic process for enhancing the level of safeguard against forgery, in which a concealed image which can be perceived only by means of a special decoding device is shaped in a hologram. When the decoding device is moved over the hologram the concealed pattern can then be visually detected by the viewer.

In that case such a hologram is generated in an encoding process from a background image and from the image to be concealed in the hologram. The background image comprises a line grating with a plurality of parallel black stripes. Now, in the encoding process, those parts of the image to be concealed, which are over the black stripes of the background image, are converted into white. Those parts of the image to be concealed, which are over the white part of the background image, are left black. Conversion into a hologram is effected by means of classic holographic technologies, in respect of which there are limitations in respect of the grating structures which can be produced, by virtue of the underlying physical principle.

Here however there is the disadvantage that such a security element can be imitated by the use of holographic procedures.

SUMMARY OF THE INVENTION

Now the object of the invention is to improve the level of safeguard against forgery of optical security elements and to provide a system for the visualisation of items of concealed information, which ensures a high degree of safeguard against forgery.

That object is attained by an optical security element in which a relief structure defined by relief parameters, in particular relief shape, relief depth, spatial frequency and azimuth angle is shaped in a surface region of a substrate layer, which region is defined by an X-axis and a Y-axis, for producing an optically perceptible effect, in which one or more of the relief parameters defining the relief structure in the surface region are varied in accordance with a parameter variation function, in which the surface region is divided into one or more pattern regions and a background region, and in which one or more of the relief parameters defining the relief structure in the one or more pattern regions are varied in accordance with a parameter variation function which is phase-displaced in relation to the parameter variation function of the background region. The invention is further attained by a system for visualising items of concealed information with such an optical security element which further has a verification element with a verification grating which is defined by a periodic transmission function and whose period corresponds to the period of the parameter variation function.

The invention achieves a number of advantages: on the one hand it is not possible to generate the relief structures necessary for the invention by means of conventional holographic methods. That applies equally for the optical effects generated by an optical security element according to the invention. They too cannot be imitated by means of conventional holographic methods. Accordingly imitation by means of conventional holographic methods is not possible. In addition novel optical effects are generated if an optical security element according to the invention is viewed through a verification element or a verification element is moved over an optical security element according to the invention. Thus striking colour and brightness changes occur in the movement and/or when viewing from different viewing angles. Those novel visual effects are inherent in the relief structure of an optical security element according to the invention so that imitation by other relief structures which are easier to produce are not possible. Accordingly an optical security element according to the invention provides a security feature which is very difficult to copy or to imitate but which on the other hand can be easily verified by a user by means of an associated verification element.

Advantageous configurations are set forth in the appendant claims.

In accordance with a preferred embodiment of the invention the relief structure in this case is formed by a diffraction grating whose azimuth angle is varied periodically in accordance with the parameter variation function in the surface region. If a verification element is applied to a surface region with such a relief structure, different optical effects can be observed by the viewer on the one hand in dependence on the alignment and orientation of the verification element and on the other hand in dependence on the viewing direction. For example a viewer perceives a surface region provided with such a relief structure, without using a verification element, from all viewing directions, as a homogeneous surface region. In a first alignment of the verification element the pattern region and the background region appear in different levels of brightness, depending on the respective viewing direction. In a second alignment or when viewing from a different viewing direction, the complementary effect occurs.

Accordingly a security feature which is easy to see but very difficult to imitate is generated in the surface region by such a relief structure.

The parameter variation function can in that case vary the azimuth angle of the diffraction grating periodically in dependence on the value of the X-axis. It is particularly advantageous if in that case the parameter variation function varies the azimuth angle of the diffraction grating in such a way that the diffraction grating is composed of a plurality of lines in serpentine line form. Attractive optical effects which can serve as an additional security feature are produced by the use of parameter variation functions of that kind, upon rotation of the verification element on the optical security element. In order to achieve such effects it is for example appropriate for the parameter variation function used to be a sine function which varies the azimuth angle of the diffraction grating in dependence on the value of the X-axis.

Still more complex security features which are therefore still more difficult to imitate can be achieved if the parameter variation function varies the azimuth angle of the diffraction grating periodically in dependence on the value of the X-axis and in dependence on the value of the Y-axis. It is possible in that way to achieve further advantages in regard to the safeguard against forgery of the optical security element according to the invention.

The parameter variation function can accordingly vary relief parameters in dependence on the value of the X-axis, in dependence on the value of the Y-axis, as well as in dependence on the value of the X-axis and in dependence on the value of the Y-axis.

The above-described diffraction grating whose azimuth angle is varied periodically in accordance with the parameter variation function desirably is of a spatial frequency of more than 300 lines per millimetre, in particular 800 to 1200 lines per millimetre, so that clearly perceptible difference in lightness come to light. It is further advantageous for the parameter variation function to be so selected that the mean azimuth angle, in relation to the resolution capacity of the human eye, is constant in the surface region. That achieves a homogeneous appearance in the surface region as long as no verification element is applied to the surface region.

In accordance with a further preferred embodiment of the invention the relief structure is a diffraction grating whose spatial frequency is varied periodically in accordance with the parameter variation function. In that way it is possible for the surface region to exhibit different colour phenomena and colour changes in the pattern region and in the background region if a verification element is applied. Those different colour phenomena and colour changes can be easily seen by the viewer and can therefore be particularly well used as a security feature.

Particularly clearly perceptible effects can be achieved when using a parameter variation function in which the spatial frequency of the diffraction grating is varied in dependence on the value of the X-axis periodically between a maximum frequency, preferably 1200 lines per millimetre, and a minimum frequency, preferably 800 lines per millimetre. In that respect preferably sawtooth, triangular or sine functions are used as the parameter variation functions.

It will be appreciated that in this case also it is possible to use parameter variation functions which vary the spatial frequency not only in dependence on the X-axis but also in dependence on the Y-axis. Security features which are still more difficult to imitate can be achieved by such complex relief structures.

It is further advantageous in this case also for the parameter variation function to be constant in relation to the resolution capacity of the human eye in that way and thus for the surface region to afford a homogeneous colour impression for a human viewer without the use of a verification element.

In accordance with further preferred embodiments of the invention the periodic parameter variation function varies the profile of the relief structure, thus for example varies the profile depth, the width of the depressions or the profile shape. The use of such parameter variation functions makes it possible to produce security features which exhibit changes in colour or lightness of the pattern region or of the background region when using a verification element. If the parameter variation function varies the profile shape periodically between asymmetrical, preferably mutually mirror-symmetrical, relief shapes, different effects, which are dependent on the viewing angle, appear in the background region and in the pattern region, when using a verification element, in dependence on the alignment of the verification element. In that way security features which are easy to see and very difficult to imitate can also be generated in the surface region by the variation in such parameters. In addition it is also possible for the relief structure to be a matt structure whose relief parameter, for example scatter angle or preferred scatter direction (in the case of anisotropic matt structures) is varied in accordance with the parameter variation function. Furthermore it is also possible for the parameter variation function to vary periodically between different kinds of relief structures, for example between a matt structure and a diffraction grating or a macrostructure.

In accordance with a further embodiment of the invention it is also possible for the relief structure to be a macrostructure with a spatial frequency of fewer than 300 lines per millimetre. Thus for example the light is reflected in different directions in dependence on the position of the verification element in the pattern and background regions so that a surface which is homogeneous without using a verification element exhibits differences in lightness which are dependent on the viewing angle in respect of the pattern and background regions when using a verification element.

It will be appreciated that it is also possible for the above-described possible options in respect of the variation in relief parameters by the parameter variation function to be combined together and thus for example it is possible to vary both the azimuth angle and also the spatial frequency periodically by means of the periodic parameter variation function. Thus for example colour-dependent, lightness-dependent and viewing angle-dependent components can be combined to afford particularly impressive security features.

In the above-depicted embodiments of the invention it has proven to be particularly advantageous for the period of the parameter variation function to be kept less than 300 μm and in particular for it to be taken from the range of 20 to 200 μm. That ensures that the pattern region cannot be distinguished from the background region by the human viewer, without using the verification element.

Further advantages are afforded if the parameter variation function is a function which is dependent both on the X-axis and also on the Y-axis and which is periodic in more than one direction, and in addition different pattern regions are phase-displaced in relation to different periodicities. In that way it is possible to achieve motion effects when rotating the verification element on the optical security element according to the invention.

In the simplest case a simple line grating with a period corresponding to the periodicity of the parameter variation function is used as the verification element. In order further to enhance the safeguard against forgery of a system according to the invention for visualisation of items of concealed information, it is in this case also possible to use a more complex line grating which for example comprises a plurality of lines in serpentine line form or a two-dimensional random pattern. In that case it is then also necessary for the mean variation of relief parameters, which is produced by the parameter variation function, to be adapted to the surface pattern of that more complex line grating.

Further improvements in the degree of safeguard against forgery can be achieved if, instead of a binary verification grating, a verification grating is used which is defined by a non-binary transmission function, for example by a sinusoidal transmission function. Visualisation of the concealed information accordingly requires a complex, individualisable verification element, whereby the level of forgery safeguard of the system is increased.

BRIEF DESCRIPTION OF THE DRAWINGS

The invention is described by way of example hereinafter by means of a number of embodiments with reference to the accompanying drawings in which:

FIGS. 7a to 7e show surface regions and relief structures respectively of an optical security element according to the invention for a further embodiment of the invention.

DETAILED DESCRIPTION OF THE INVENTION

Figure 1:
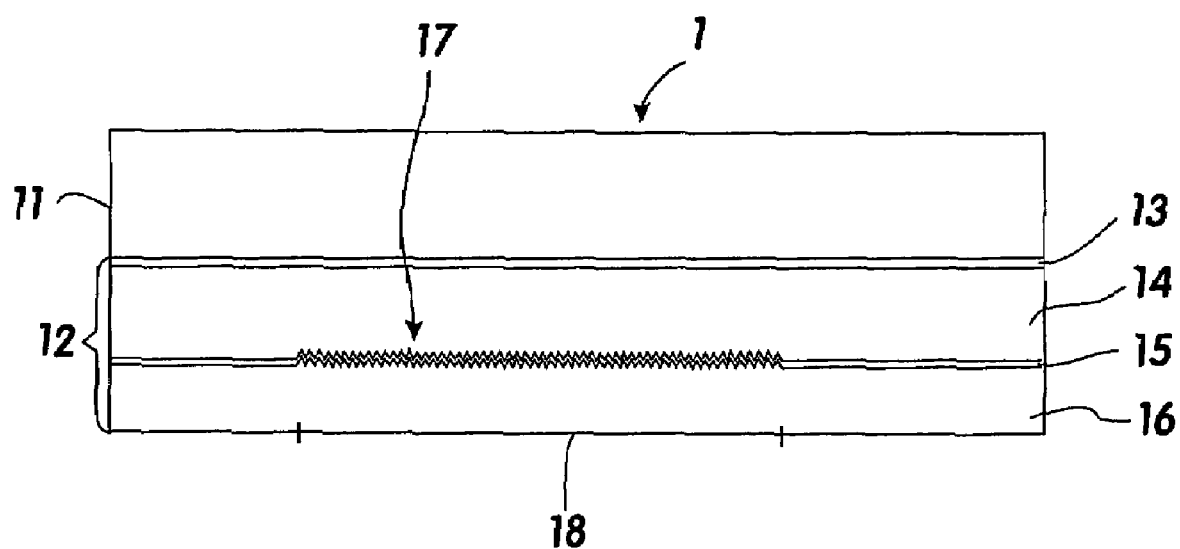
FIG. 1 shows a diagrammatic view in cross-section through an optical security element according to the invention.

FIG. 1 shows a stamping film 1 which has a carrier film 11 and a transfer layer portion 12 serving as an optical security element. The transfer layer portion 12 has a release and/or protective lacquer layer 13, a replication layer 14, a reflection layer 15 and an adhesive layer 16. The carrier layer 21 comprises for example a polyester film of a thickness of 12 µm to 50 µm. Applied to the carrier film is the release and/or protective lacquer layer 13, in a thickness of 0.3 to 1.2 µm, as well as the replication layer 14. It would also be possible in that respect to dispense with the release and/or protective lacquer layer 13.

The replication layer 14 is preferably a transparent thermoplastic material which is applied for example by means of a printing process to the film body formed by the carrier film 11 and the protective lacquer and/or release layer 13. After drying a relief structure 17 is replicated into the replication layer in the region 18 by means of a stamping tool. It is however also possible for the replication operation to be performed by means of a UV replication process, in which a UV replication lacquer is applied to the film body formed by the carrier film 11 and the release and/or protective lacquer layer 13 and then partially irradiated with UV light for replication of the relief structure 17. After replication of the relief structure 17 in the replication layer 14 the replication lacquer hardens by cross-linking or in some other fashion.

A thin reflection layer 15 is now applied to the replication layer 14. The reflection layer 15 is preferably a thin; vapour-deposited metal layer or an HRI layer (HRI=High Refraction Index). For example $TiO_2$, $ZnS$ or $Nb_2O_5$ can be used as materials for an HRI layer. Essentially chromium, aluminium, copper, iron, nickel, silver, gold or an alloy with those materials can be used as the material for the metal layer. In addition instead of such a metallic or dielectric reflection layer, it is possible to use a thin film layer sequence with a plurality of dielectric or dielectric and metallic layers.

The adhesive layer 16 which for example comprises a thermally activatable adhesive is now applied to the film body formed in that way.

To apply the optical security element to a security document or some other article to be safeguarded, the stamping film is applied with the transfer layer portion 12 leading to the security document or to the article to be safeguarded and in that operation the carrier film 11 is pulled off the transfer layer portion 12 and removed.

It will be appreciated that it is also possible for an optical security element according to the invention to be part of a transfer, sticker or laminating film or to be formed by a stamping film, a sticker film, a transfer film or a laminating film. In addition it will be appreciated that it is also possible for an optical security element according to the invention, besides the layers 13, 14, 15 and 16 shown in FIG. 1, to have further layers. Such further layers can be for example (coloured) decorative layers or layers of a thin film layer system which produces colour shifts in dependence on the angle of view, by means of interference.

Furthermore it is also possible for the reflection layer 15 to be only partially implemented or to be entirely dispensed with so that the optical security element acts as a transparent and not as a reflective security element. It would also be possible to dispense with the adhesive layer 16.

Figure 2A:
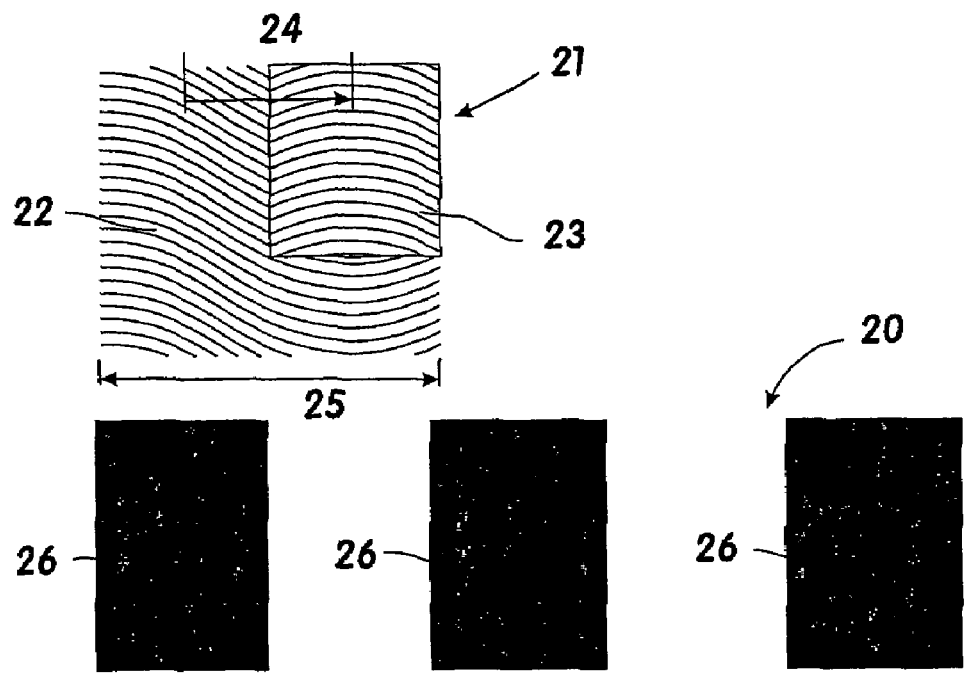
FIG. 2a shows a functional diagrammatic view illustrating a portion of a surface region of an optical security element according to the invention as set forth in claim 1.

The precise shape of the relief structure 17 and the optical effects produced by the relief structure 17 will now be described with reference to FIGS. 2a to 2c:

FIG. 2a shows a partial surface region 21 having a pattern region 23 and a background region 22, as well as a part of a verification element 20 with three line gratings 26. FIG. 2b shows a surface region 27 with a background region 28 and two pattern regions 29 and 30, the partial surface region 21 showing a part from the surface region 27.

Figure 2B:
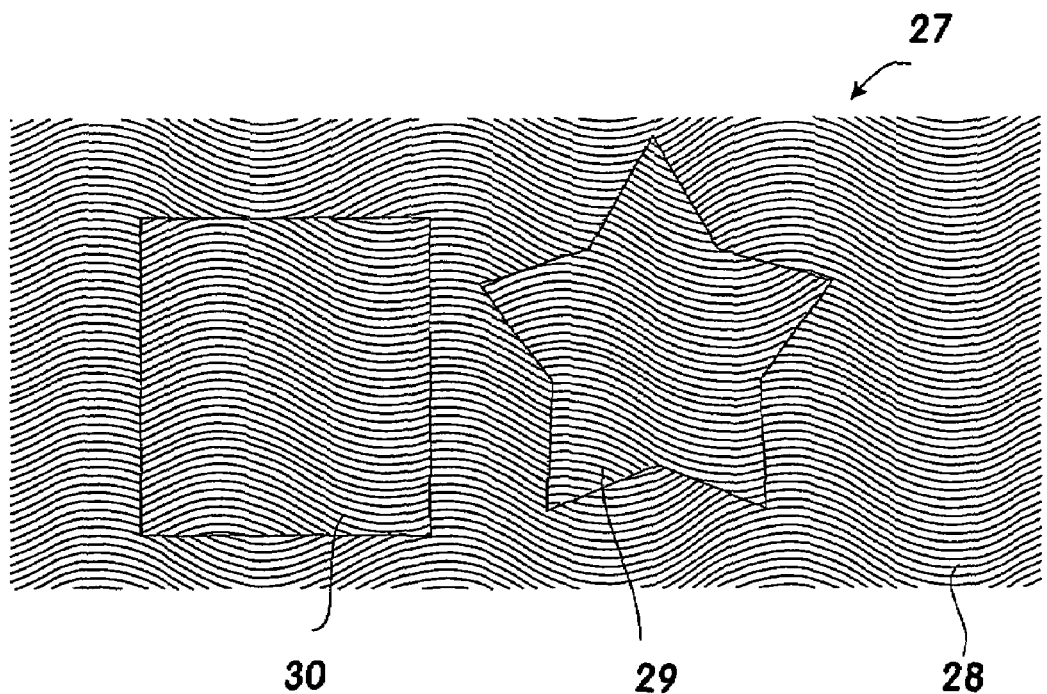
FIG. 2b shows a surface region of the optical security element according to the invention as shown in FIG. 1.

As can be seen from FIGS. 2a and 2b a relief structure is shaped in the surface region 27 and in the partial surface region 21 respectively, the azimuth angle of the relief structure being varied in a serpentine line form in dependence on the value of the X-axis.

The relief structure is preferably shaped in the replication layer 14 by means of an electron beam lithography system which permits periods in the submicron range to the micron range or by means of a photolithographic process which permits periods of less than 1 µm. In that respect the spatial frequency of the relief structure is about 1000 lines per millimetre. The period of the parameter variation function which varies the azimuth angle of the relief structure 17 periodically between +40 degrees and −40 degrees is preferably 20 to 300 µm. The parameter variation function is a sine function. It will be appreciated that it is also possible to use another periodic function as the parameter variation function or to provide other minimum/maximum azimuth angles.

In addition the views in FIGS. 2a and 2b serve only to explain the functional principle and are not true to scale. Usually the pattern regions 23, 30 and 29 are of dimensions which correspond to a multiple of the period of the parameter variation function and at any event vary in a range which can be resolved by the human eye.

The partial region 23 is of a width which corresponds to the length of a period 25 of the parameter variation function and is thus for example 100 µm wide. As can be seen from FIGS. 2a and 2b the azimuth angle of the relief structure 17 is varied in the background regions 22 and 28 and the pattern regions 23, 30 and 29 by parameter variation functions which are phase-displaced relative to each other through 180 degrees and which are otherwise identical. As indicated in FIG. 2d the parameter variation function used in the pattern region 23 is thus displaced by half a period length 24, that is to say by 50 µm, with respect to the parameter variation function used in the background region 22. A phase displacement of 180 degrees permits a particularly great contrast between the pattern region and the background region. It will be appreciated that it is also possible in that respect to deviate somewhat from the phase displacement through 180 degrees. In addition advantages can also be enjoyed in deviating considerably from a phase displacement of 180 degrees and providing for example a phase displacement of 45 degrees or 135 degrees, in the one pattern region or the other. Thus it is possible for example to implement concealed grey scale images in which the grey scale is encoded by means of the phase displacement.

Without use of the verification element 20 the surface region 27 now appears to be homogeneous to the human viewer as the mean azimuth angle which can be resolved by the human eye is constant in the pattern regions 29 and 30 and in the background region 28 surrounding them. A homogeneous optical effect which is dependent on the viewing angle is then afforded for the viewer in the surface region 28, that effect being dependent on the azimuth angle range covered by the parameter variation function and on the selected spatial frequency of the relief structure 17.

Figure 2C:
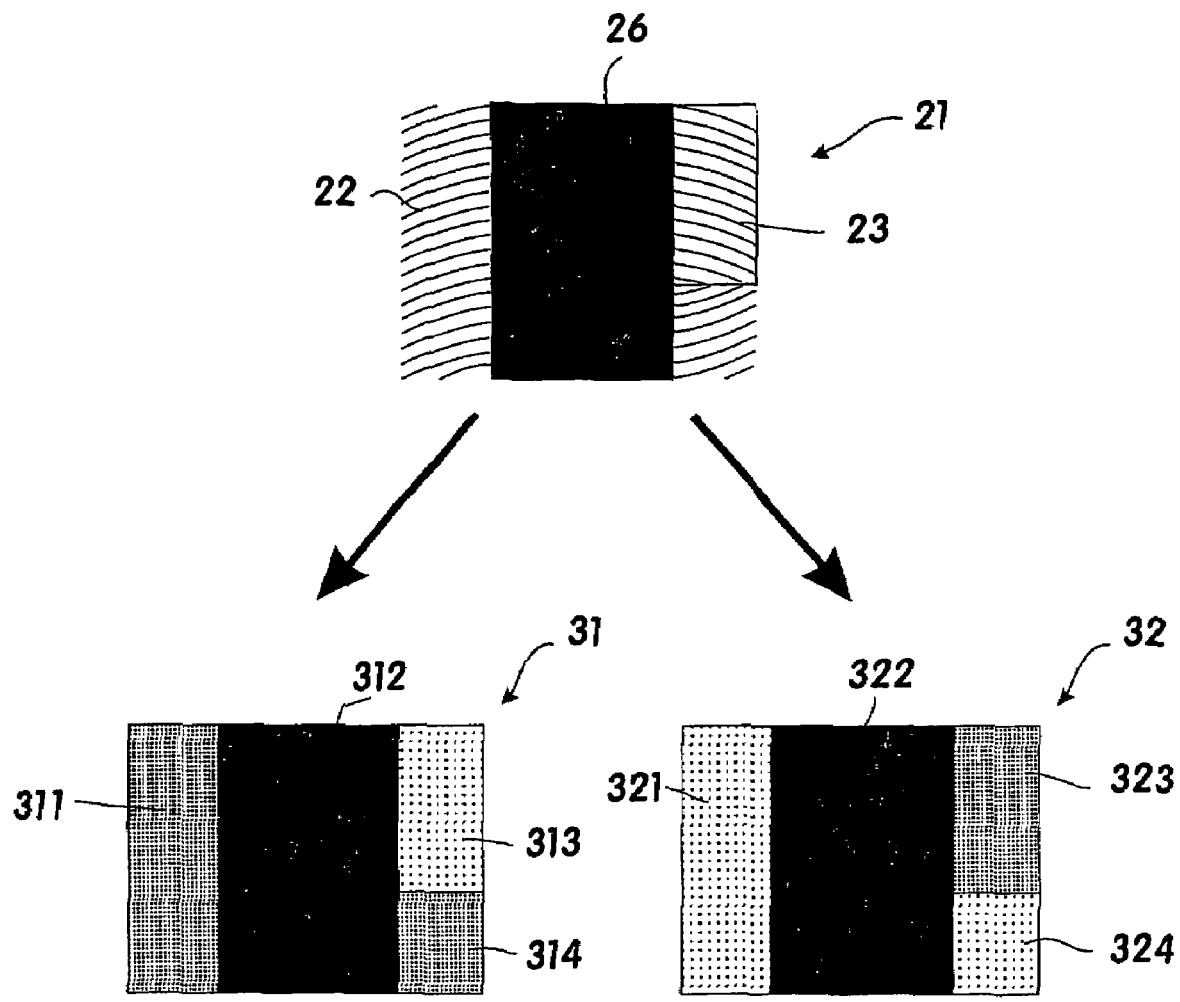
FIG. 2c shows a view to illustrate the mode of operation in principle of the optical security element according to the invention as shown in FIG. 1.

FIG. 2c now shows the situation in which the verification element 20 is placed on the partial surface region 21. The light source is in the Y-Z plane so that the k-vector of the light does not have any Y-component.

FIG. 2c shows the partial surface region 21, the line grating 26, the pattern region 23 and the background region 22. In addition FIG. 2c shows an optical impression 31 of a viewer who is viewing the partial surface 21 from the left-hand side and an optical impression 32 of a viewer who is viewing the partial surface region from the right-hand side.

As shown in FIG. 2c the grating lines 26 of the verification element 20 cover only the surface regions of the background region 22 with negative azimuth angles and only surface regions of the pattern region 21 with positive azimuth angles. If the partial surface region 21 is viewed from a negative azimuth angle, that is to say from the left, the background region 22 is accordingly dark and the pattern region 23 light. If the partial region 21 is viewed from the positive azimuth angle side, that is to say from the right, the background region 22 is light and the pattern region 23 dark.

The optical impression 31 thus shows a coverage 312 by the grating line 26, dark regions 311 and 314 in the region of the background region 22 and a light region 313 in the region of the pattern region 23. As a counterpart the optical impression 23 exhibits coverage 322 by the grating line 26 and light regions 321 and 324 in the region of the background region 22 and a dark region 323 in the region of the pattern region 23.

In real viewing the coverages 312 and 322 disappear as the period of the parameter variation function ranges in an order of magnitude which can no longer be resolved by the human eye. Accordingly, light pattern regions and dark background regions are provided for the viewer from the left-hand side and dark pattern regions and a light background region for the viewer from the right-hand side. If the verification element 20 is displaced by half a period of the parameter variation function, the contrary impression is afforded, that is to say a light background region and dark pattern regions when viewing from the left-hand side and a dark background region and light pattern regions when viewing from the right-hand side. If accordingly the optical security element is viewed through the verification element 20, dynamic control of the lightness contrast is afforded.

Figure 3:
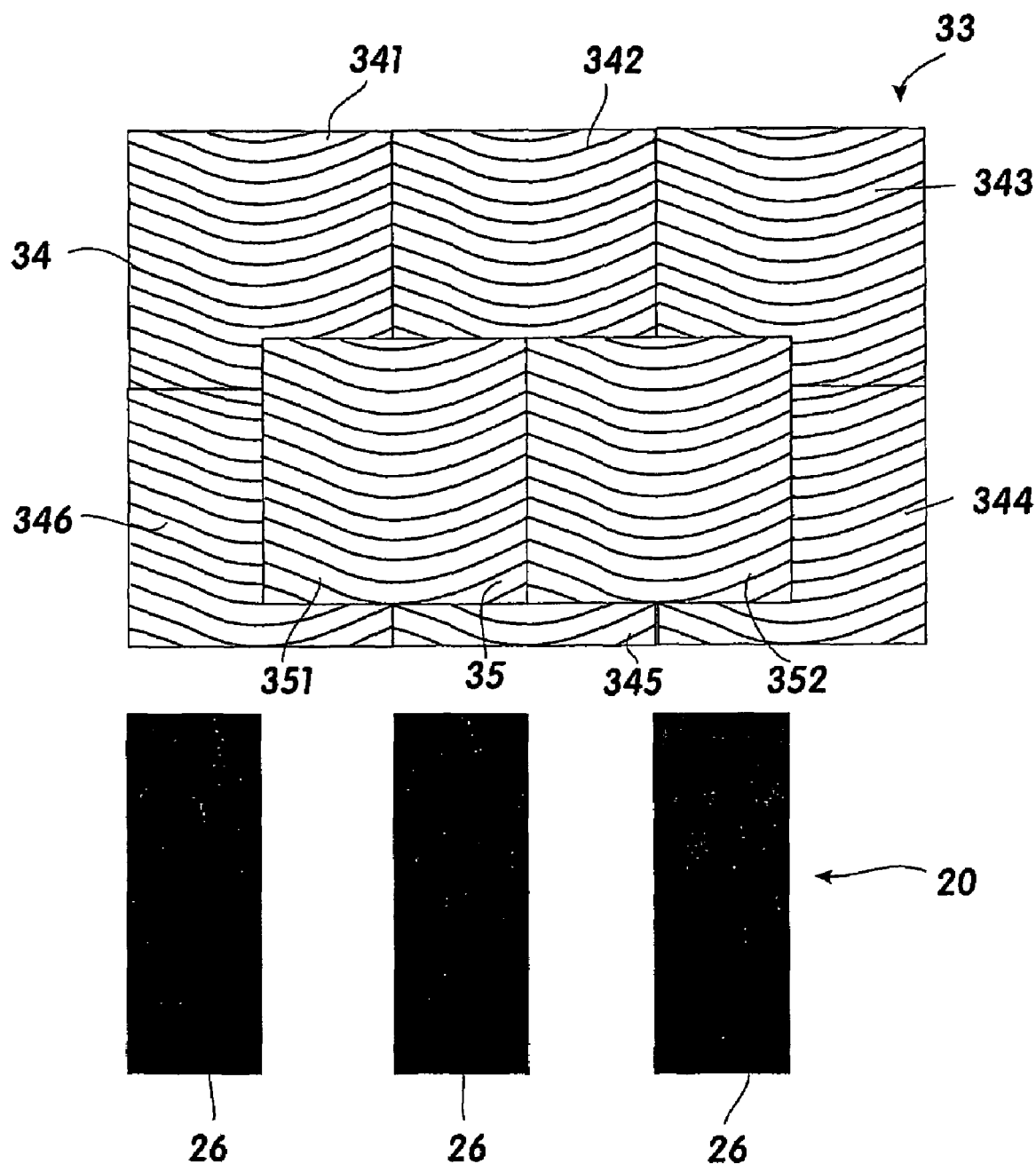
FIG. 3 shows a diagrammatic view of a surface region of an optical security element according to the invention for a further embodiment of the invention.
Figure 4:
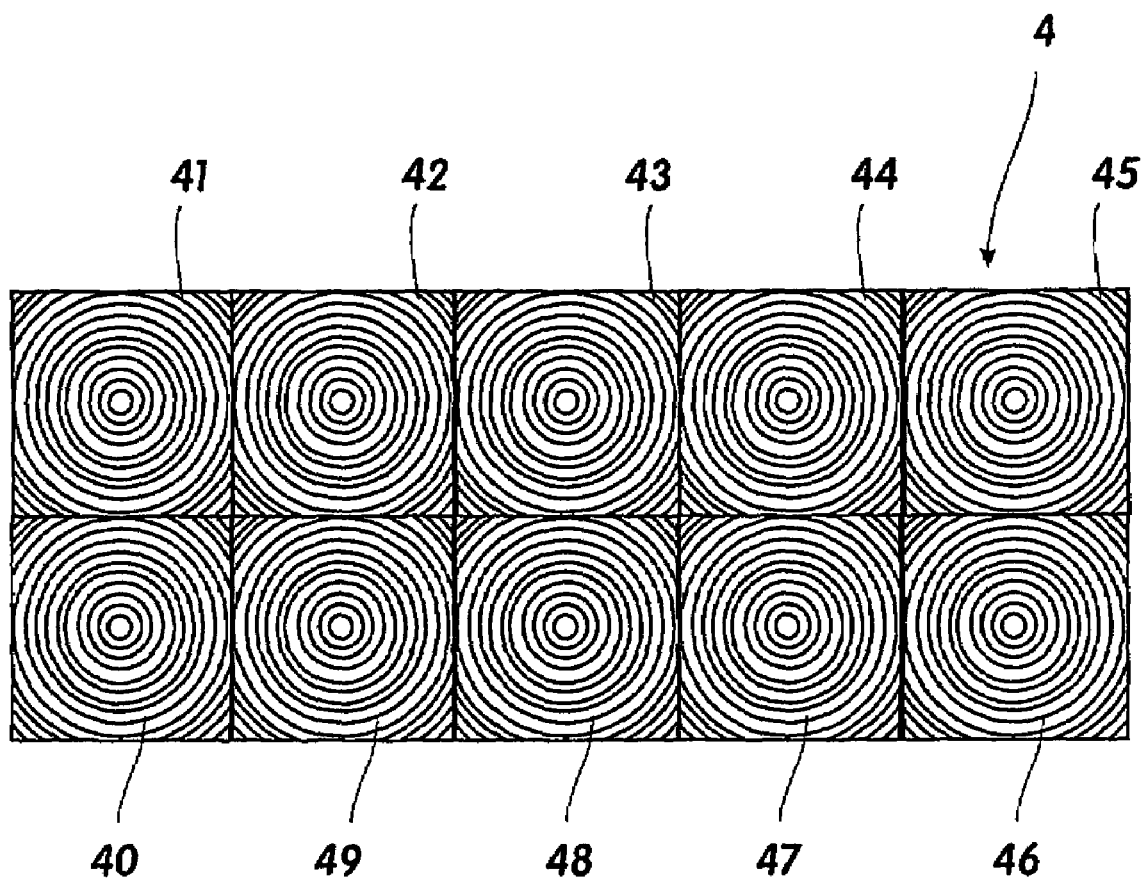
FIG. 4 shows a diagrammatic view of a surface region of an optical security element according to the invention for a further embodiment of the invention.

FIGS. 3 and 4 now show two further embodiments of the invention in which the azimuth angle of the relief structure 17 is varied by a periodic parameter variation function.

FIG. 3 shows a surface region 33 with a background region 34 and a pattern region 35 and a partial region of the verification element 20 with a plurality of grating lines 26.

The period of the parameter variation function shown in FIG. 3 is 50 µm so that the line spacing of the grating lines 26 is here also 50 µm. As FIG. 3 shows the background region 34 is formed by six partial regions 341 to 346. The partial regions 341 to 346 each involve the width of a period of the parameter variation function which is a function which is composed periodically of parabolic portions. The pattern region 35 is formed by two partial surfaces 351 and 352 which are also of the width of a period of the parameter variation function.

As in the embodiment of FIGS. 2a and 2b, either the negative azimuth angle regions of the background region 34 and the positive azimuth angle regions of the pattern region 35 or the positive azimuth angle regions of the background region 34 and the negative azimuth angle regions of the pattern region 35 are covered by the grating lines 26. That gives the effect described with reference to FIG. 2c, wherein the appearance is somewhat different, from different viewing directions, in comparison with the surface region 27, by virtue of the differing parameter variation function.

FIG. 4 shows a surface region 4 which is composed of a plurality of partial regions 40 to 49. The surface regions 40 to 49 are each formed by respective identical diffraction structures which each have a plurality of concentric rings arranged in a circular configuration around the centre of the respective partial surface. The width and height of a partial surface is about 100 μm while the spatial frequency of the diffraction structure is about 1000 lines per millimetre.

Accordingly FIG. 4 shows an example of a periodic parameter variation function in which the azimuth angle of the diffraction structure 17 is varied periodically in dependence on the value of the X-axis and Y-axis. That function therefore exhibits a periodicity both in the X-axis and also in the Y-axis so that items of concealed information can be read out with a differing orientation of the verification element 20. Pattern regions are now placed in the surface region 4 in accordance with the kind shown in FIG. 3 so that the partial surfaces 41 to 46 are covered by identical but phase-displaced partial surfaces. In this case a phase displacement of the partial surfaces of a possible pattern is possible both in the X-direction and also in the Y-direction, depending on the respective choice of that phase displacement the pattern region can then be read out when the grating is oriented in the Y-direction or in the X-direction respectively.

A further embodiment of the invention is described hereinafter with references to FIGS. 5a to 5d, in which the relief structure is a diffraction grating whose spatial frequency varies periodically in accordance with the parameter variation function.

Figure 5A:
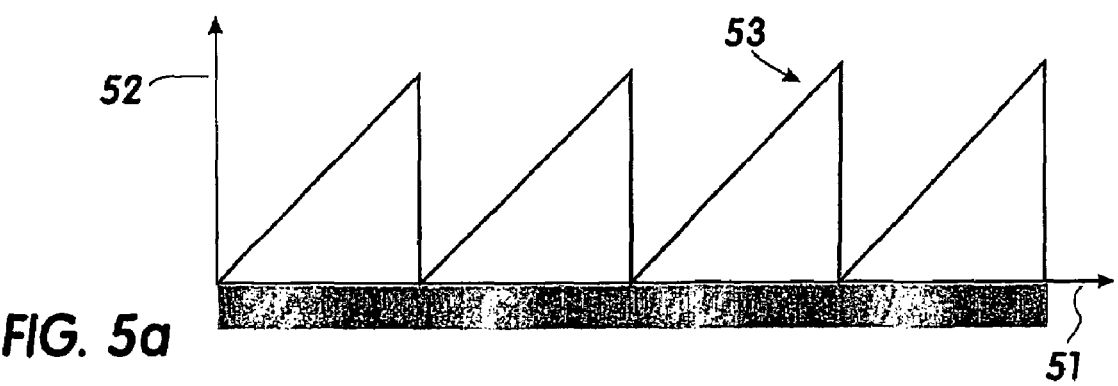
FIGS. 5a to 5c show views of possible parameter variation functions for a further embodiment of an optical security element according to the invention.
Figure 5B:
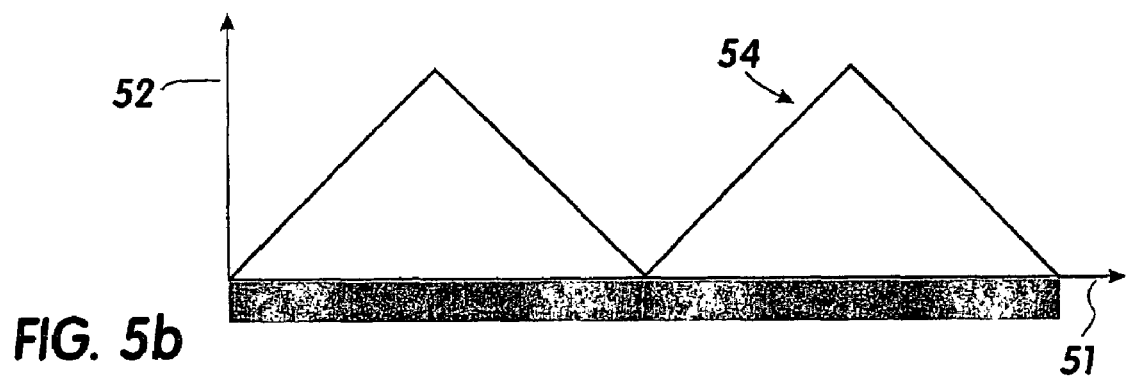
Figure 5C:
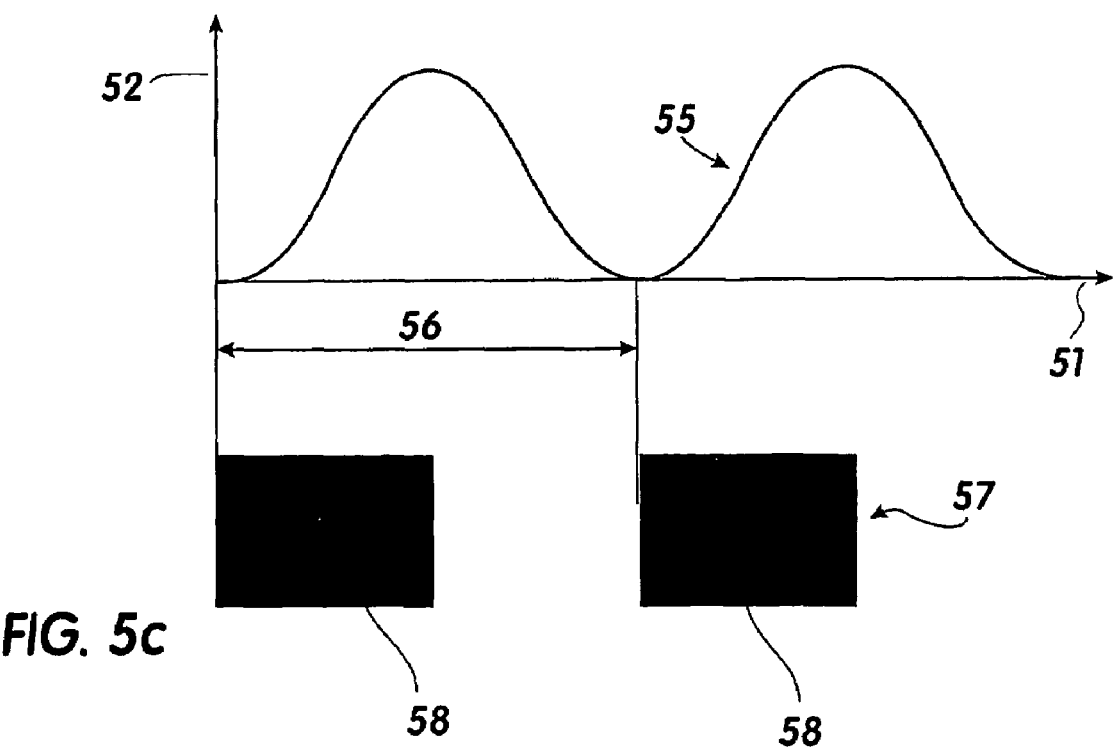

FIGS. 5a to 5c show three different parameter variation functions 53, 54 and 55 which vary a spatial frequency 52 in dependence on a value 51 of the X-axis of the surface region. The k-vector of the relief structures described with reference to FIGS. 5a to 5c is oriented in the direction of the Y-axis so that the grooves of the relief structure are oriented parallel to the X-axis. The grating lines 58 are also oriented parallel to the X-axis.

The parameter variation function 53 is a sawtooth-shaped function which varies the spatial frequency in the range of 800 lines per millimetre to 1200 lines per millimetre in a sawtooth-shaped configuration. The period of the parameter variation function is 50 μm. At the minima of the parameter variation function 53, that is to say at a value of 800 lines per millimetre, there is a red colour impression which then changes linearly to a blue colour impression at the next maxima at 1200 lines per millimetre. Within a period accordingly the colour impression changes from red to blue. In that respect the colour impressions relate to a typical illumination/viewing angle combination.

The parameter variation function 54 is a triangular function with a period of 100 μm, which varies the spatial frequency of the diffraction grating from a minimum value of 800 lines per millimetre to a maximum value of 1200 lines per millimetre and back. Accordingly within a period the colour impression changes from red to blue and back from blue to red again.

The parameter variation function 55 is a sine function with a period of 100 μm, which varies the spatial frequency of the diffraction grating in dependence on the value of the X-axis from a minimum value of 800 lines per millimetre to a maximum value of 1200 lines per millimetre and back. Accordingly within a period there is a colour impression from red to blue and back to red.

As the period of the parameter variation functions 53 to 55 lies below the resolution capacity of the human eye, the viewer, within the surface region, has a unitary colour impression arising out of the mix of the colour spectrum determined by the parameter variation function. If now a verification element 57 with the grating lines 58 which have a line spacing 56 corresponding to the period of the parameter variation function is applied to that diffraction grating, then a given part of the colour spectrum is respectively covered by the grating lines 58 so that the colour impression changes upon movement of the verification element over the diffraction grating.

Figure 5D:
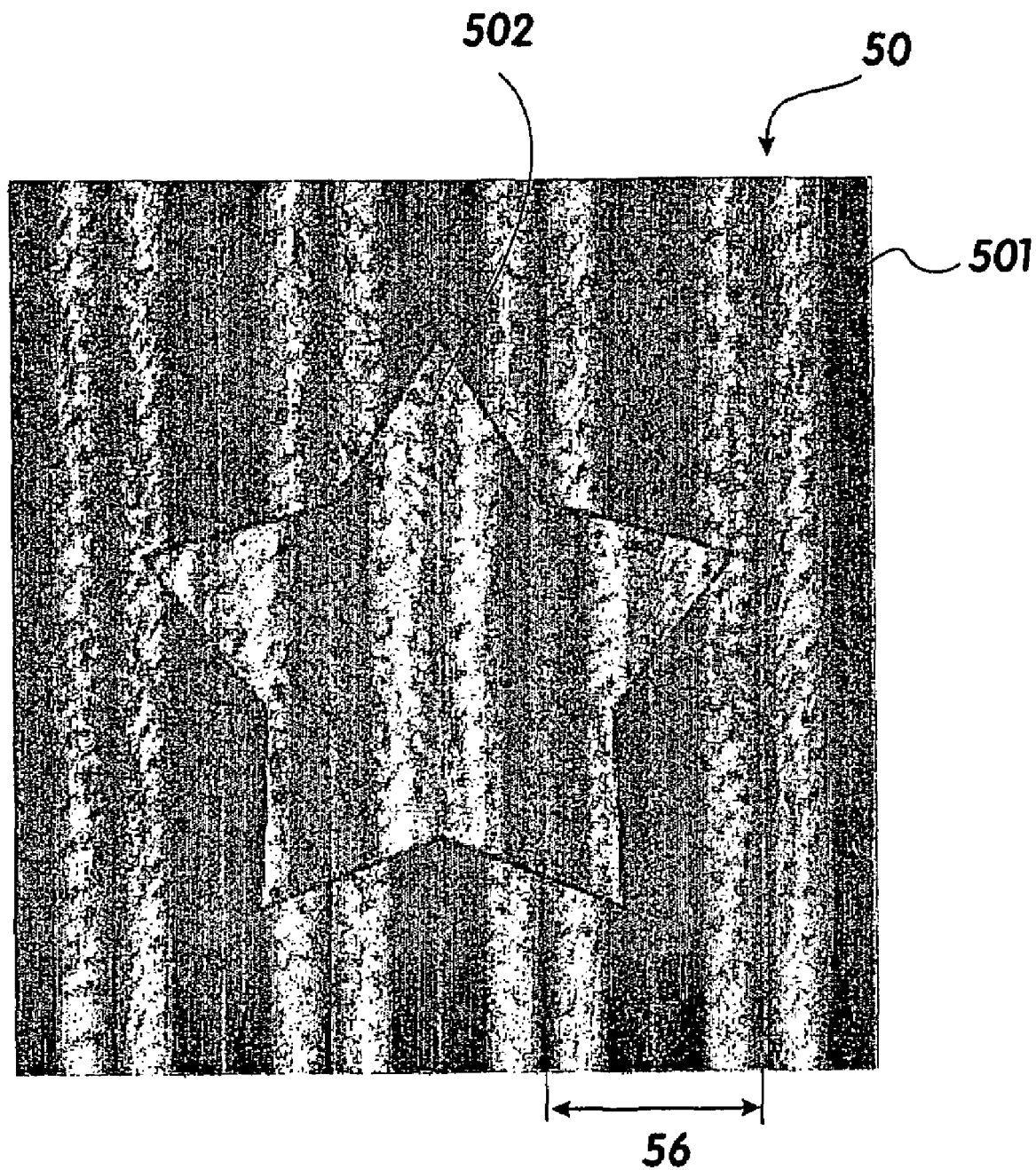
FIG. 5d shows a view of a surface region of an optical security element according to the invention for a further embodiment of the invention.

FIG. 5d now shows a surface region 50 with a background region 501 and a pattern region 502. In the background region 501 the spatial frequency of the relief structure is varied in accordance with the parameter variation function 54. In the pattern region 502 the spatial frequency of the relief structure is varied with a parameter variation function 54 which is phase-displaced by half a period, that is to say by 50 μm. If now the verification element 57 with the line grating spacing 56 is moved over the surface region 50, respectively different colour regions are covered in the background region 501 and the pattern region 502 so that the pattern region 502 gives the human viewer a different colour impression from the background region 501. If the verification element 57 is thus moved over the pattern region 50, there is for example firstly the impression of a blue pattern region and a red background region which then, with the movement of the verification element, steadily goes to a red pattern region against a blue background region.

As already stated hereinbefore with reference to FIG. 2b FIG. 5d serves only to explain the operating principle involved. Usually pattern regions are of an extent which embraces a plurality of periods of the parameter variation function and which is in an order of magnitude which can be resolved by the human eye.

Accordingly the parameter variation function on the one hand determines the homogeneous colour impression which is produced in the situation in which no verification element is applied to the surface region 50. In addition the parameter variation function determines how the colour changes upon displacement of the verification element over the surface region 50 (for example abrupt colour changes when using the parameter variation function 53), this serving as an additional security feature.

Figure 6A:
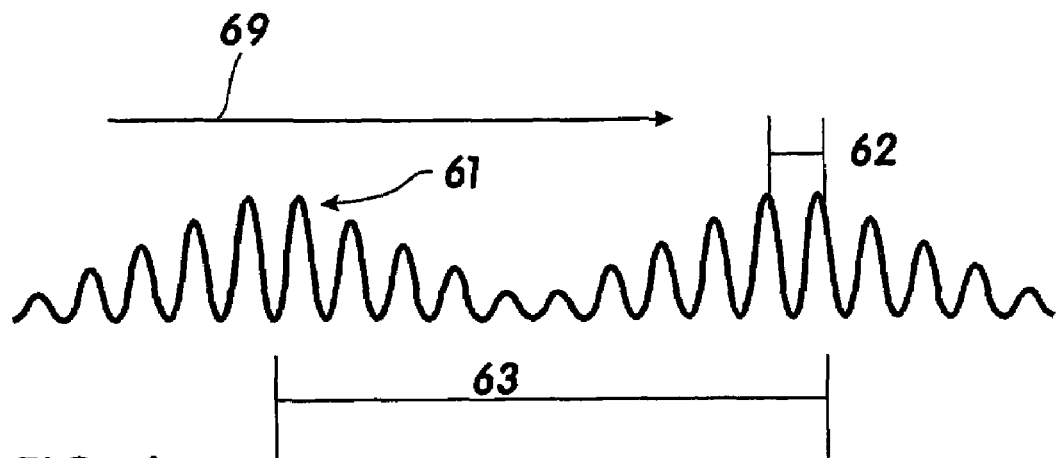
FIGS. 6a and 6b show a relief structure and a surface region respectively of an optical security element according to the invention for a further embodiment of the invention.
Figure 6B:
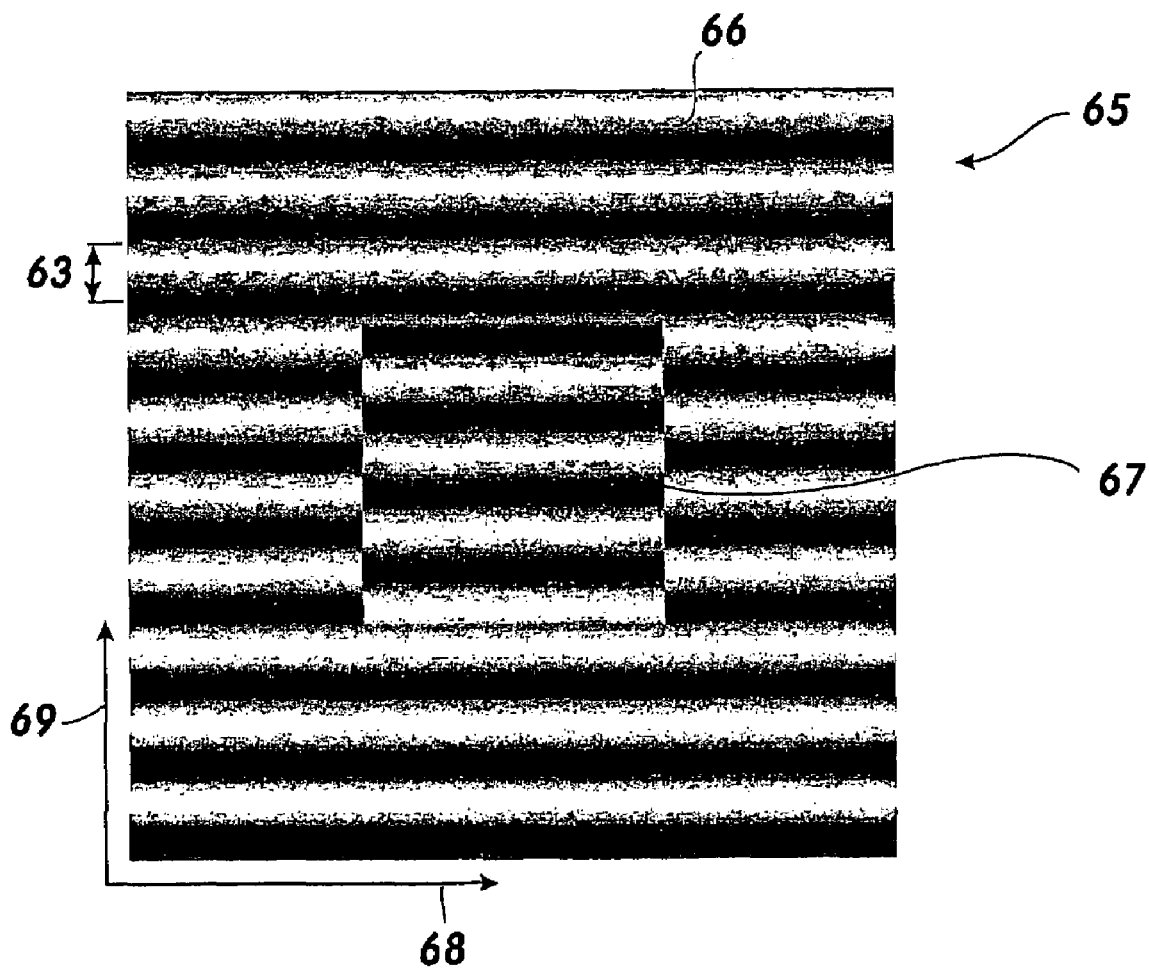

Reference will now be made to FIGS. 6a and 6b to describe a further embodiment of the invention in which the relief structure is a diffraction grating whose profile depth is varied periodically in accordance with the parameter variation function.

FIG. 6a shows a relief structure 61 whose profile depth is varied with a constant spatial frequency by a periodic parameter variation function with a period 63.

The relief structure 61 is preferably a first-order diffraction structure (spatial frequency range varies in the range of the wavelength) or a zero-order diffraction structure (line spacing is less than the wavelength of the light). The profile depth is altered by the periodic parameter variation function more slowly in comparison with the spatial frequency of the diffraction grating in dependence on the value of the X-axis or in dependence on the value of the X-axis and the Y-axis. The period of the parameter variation function is between 10 μm and 100 μm and is preferably of a value around 100 μm.

The relief structure 61 shown in FIG. 6a thus involves for example a spatial frequency of 1000 lines per millimetre and the line spacing 62 is thus 1 μm. The period 63 is 1000 μm and the profile depth is varied periodically in dependence on the value of a Y-axis 69 between 0 nm and for example 150 nm.

FIG. 6b now shows a surface region 65 defined by an X-axis 68 ad the Y-axis 69, with a background region 66 and a pattern region 67, in which the relief structure 61 is varied periodically in the direction of the Y-axis, as shown in FIG. 6a. As shown in FIG. 6b, in the pattern region 67 the parameter variation function is displaced by half a period, that is to say by 50 µm, with respect to the parameter variation function of the background region 66.

If now the surface region 65 is viewed through a verification element with a line grating of 100 µm, then regions of different profile depths are covered in the background region 66 and the pattern region 67 so that the pattern region 67 no longer appears homogeneous. When the verification element is applied, there is thus a brightness contrast between the pattern region and the background region, which changes when the verification element is displaced. When thus the regions of the background region of around 150 nm profile depth are covered by the line grating, the background region appears darker as the optical effect produced in the background region is determined by profile depths around 0 nm. Conversely the pattern region appears lighter in that position of the verification element. Upon displacement of the verification element that effect then slowly changes to the opposite so that the background region appears lighter and the pattern region appears darker.

A further embodiment of the invention will now be described with reference to FIGS. 7a to 7e, in which the relief shape of the relief structure is varied periodically in accordance with the parameter variation function.

FIG. 7a shows a surface region 7 with a pattern region 74 and a background region 73. The surface region 7 further has a periodic succession of partial regions 71 and 72 in the direction of the X-axis, wherein in partial regions 71 a relief shape 76 is shaped in the background region and a relief shape 75 is shaped in the pattern region and in partial regions 72 the relief shape 75 is shaped in the background region and the relief shape 76 is shaped in the pattern region.

The width of the partial regions 71 and 72 is less than 300 µm so that the partial regions 71 and 72 cannot be resolved by the human eye. The relief shapes 75 and 76 represent asymmetrical, mutually mirrored structures so that the profile shape 76 can also be viewed as a relief structure 75 in which the azimuth angle is turned with respect to the relief shape 75 through 180 degrees. Typical spatial frequencies of the profile shapes 75 and 76 are in the range of 1200 lines per millimetre to 150 lines per millimetre.

The width of the partial regions 71 and 72 is thus for example 50 µm in each case so that the period of the parameter variation function of the surface region 7 is 100 µm. The spatial frequency of the profile shapes 75 and 76 is for example 1150 lines per millimetre.

If now the surface region 7 is viewed without using a verification element, a homogeneous impression is produced in the surface region 7 for the human viewer, that impression corresponding to that of a sinusoidal diffraction grating with a spatial frequency of the profile shapes 75 and 76, that is to say of 1150 lines per millimetre.

If a verification element with a period which corresponds or almost corresponds to the period of the parameter variation function is applied to the surface region 7 the pattern region 74 becomes visible. Depending on whether the grating lines cover the profile shapes 75 or 76 of the pattern region 74, the viewer sees a dark pattern region against a light background region or a light pattern region against a dark background region. If the surface region is turned through 180 degrees, the viewer sees the complementary impression.

Thus for example when the partial regions 71 are covered by grating lines 77 in the surface region 7 there is the effect shown in FIG. 7d, that the pattern region 74 appears dark and the background region 73 appears light. If the surface region 7 is turned through 180 degrees, that gives the situation shown in FIG. 7e, of a light pattern region 74 against a dark background region 73. As the period of the parameter variation function is less than the resolution capacity of the human eye, the grating lines 77 are not visible to the viewer so that, when viewing the surface region in the situation shown in FIG. 7d the dark surface region 74 against the light background region 73 is visible to the viewer while in the situation shown in FIG. 7e the light background region 74 is visible against the dark background region 73. That additional tilting effect when viewing from directions which are turned through 180° relative to each other forms an additional security feature.

It will be appreciated that it is also possible for the parameter variation function to be varied in the partial regions 71 and 72 between any other asymmetrical profile shapes. In addition it is also possible for the parameter variation function not to be a binary function which distinguishes between two different profile shapes, but for example for the angle of inclination of the profile shape 75 to be varied linearly in accordance with a sine function. That also affords additional security features which contribute to enhancing the level of safeguard against forgery.

In addition it is also generally possible to use parameter variation functions in which the relief shape changes periodically. The relief profile can thus be represented for example by a function:

$$f_3(x)=f_1(x)+f_2(x)$$

in which:

$$f_1(x) = b\,\sin\left(\frac{2\pi x}{d}\right)$$
$$f_2(x) = \frac{b}{2}\sin\left(\frac{2\pi x}{d/2} + \beta(x)\right)$$

Thus it is also possible for the parameter variation function to vary the relief shape of the relief structure periodically in accordance with the parameter variation function, by varying the width of the troughs of the relief structure periodically in accordance with the parameter variation function.

That will now be illustrated by way of example with reference to FIGS. 8a to 8e.

Figure 8A:
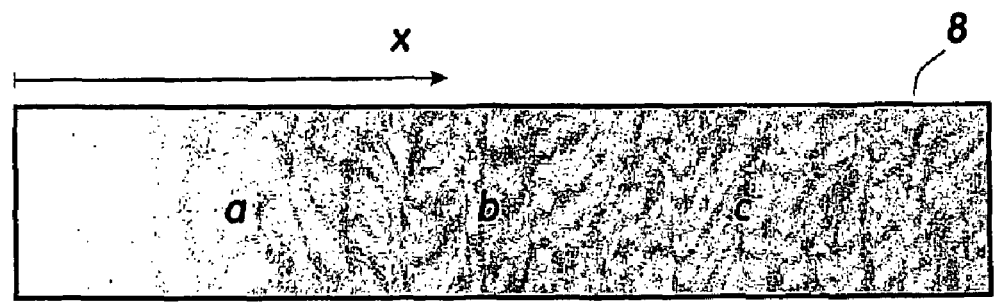
FIGS. 8a to 8e show a surface region, a portion of a parameter variation function and a plurality of relief shapes of an optical security element for a further embodiment of the invention.
Figure 8B:
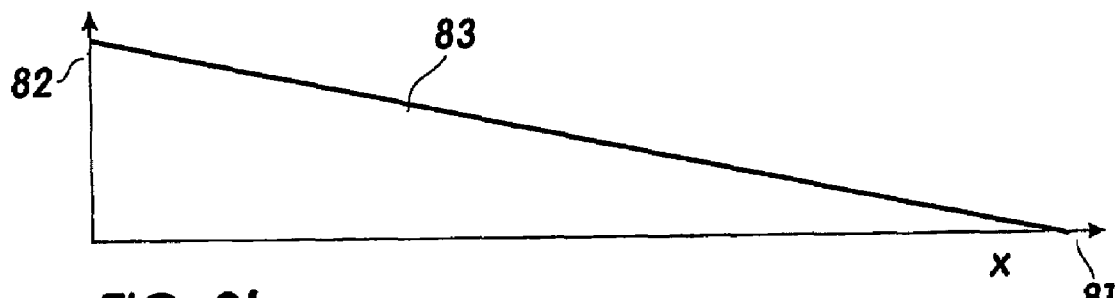
Figure 8C:
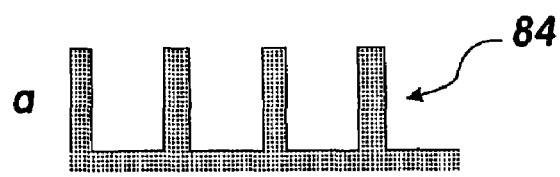
Figure 8D:
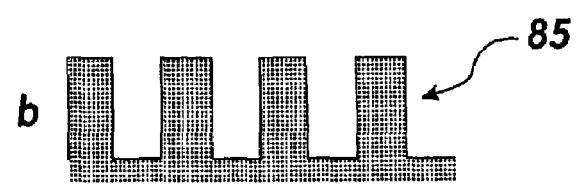
Figure 8E:
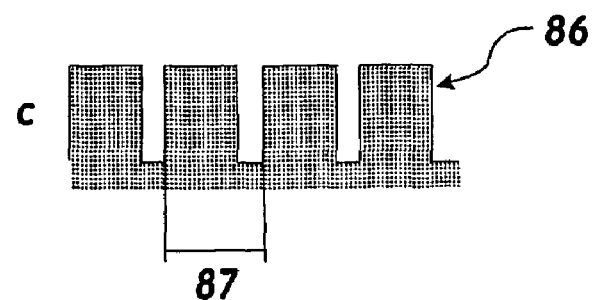

In a region 8 corresponding to a period of the parameter variation function the width of the troughs of the relief structure is reduced linearly with a constant spatial frequency. As shown in FIG. 8b in that way a width 82 of the troughs of the relief structure is varied along an X-axis 81 in accordance with a function 83. The parameter variation function is for example a sawtooth-shaped function which varies the width of a rectangular relief structure with a line spacing of 300 nm between 230 and 70 nm. That gives a profile shape 84 (FIG. 8c) in a region a of the surface region 8, a profile shape 85 (FIG. 8d) in a region b of the surface region 8 and a profile shape 86 (FIG. 8e) in a region c of the surface region 8, wherein the profile shapes 84, 85 and 86 have a line spacing 87 of 300 nm.

In accordance with the selected spatial frequency, optical effects of different colour and lightness are produced in the regions a, b and c so that, with a phase displacement of the pattern and the background regions, the optical superimposition effects already referred to above when using a verification element/without using a verification element are produced. The period of the parameter variation function is here preferably also in the range of 40 to 300 µm.

Figure 9A:
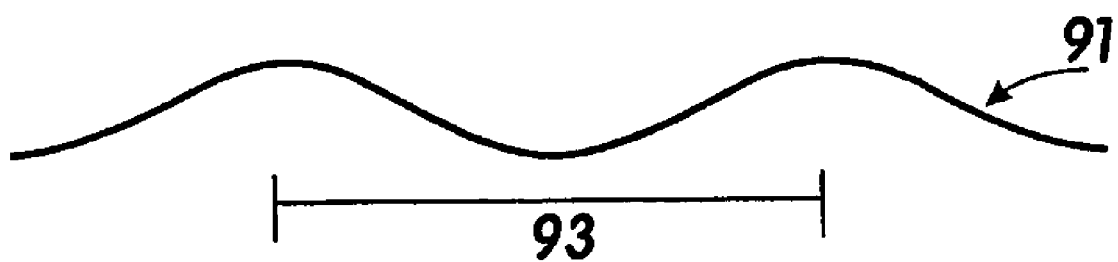
FIGS. 9a and 9b show diagrammatic views of relief structures of an optical security element for a further embodiment of the invention.
Figure 9B:

In accordance with a further embodiment of the invention it is also possible to use a macrostructure of more than 300 lines per millimetre as the relief structure. Typical periods of such a macrostructure are 10 μm. Macrostructures thus operate substantially by reflection and not by diffraction. Two such macrostructures are shown in FIGS. 9a and 9b, wherein FIG. 9a describes a macrostructure 91 with a period 93 and FIG. 9b describes a macrostructure 92 with the period 93. The period 93 is for example 100 μm. If now the macrostructures 91 and 92 are viewed through a verification element with a line spacing corresponding to the period 93, different regions of the macrostructures 91 and 92 are thus visible depending on the respective position of the verification element. In the pattern regions the macrostructure 91 is now phase-displaced with respect to the macrostructure in the background region so that respectively different regions of the macrostructures 91 and 92 are visible in the background region and in the pattern region when using the verification element. If the verification element is not applied the entire surface region appears homogeneous. When the verification element is applied there is a lightness contrast between the pattern region and the background region.

Figure 10A:
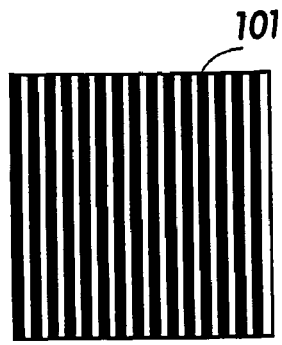
FIGS. 10a to 10f show diagrammatic views of various verification elements for a system according to the invention for the visualisation of items of concealed information.
Figure 10B:
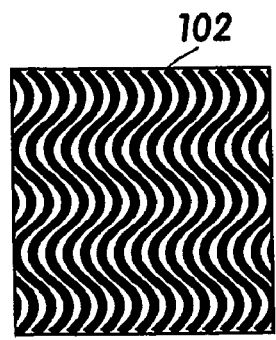
Figure 10C:
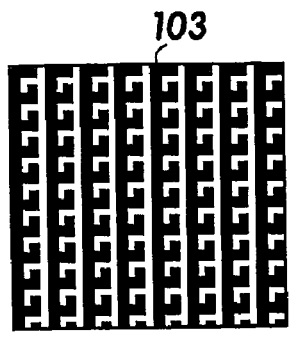
Figure 10D:
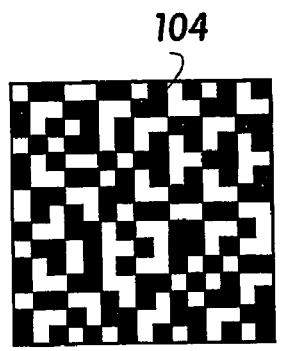
Figure 10E:
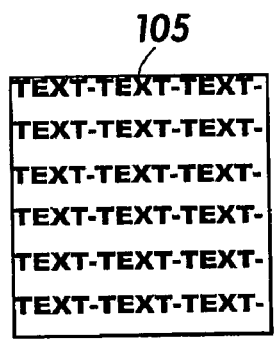
Figure 10F:
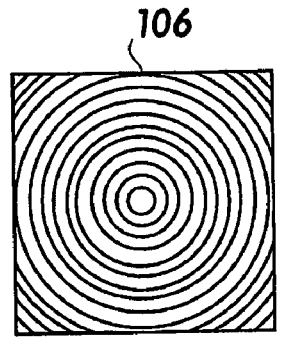

The embodiments shown in FIGS. 1 to 9d are each described with reference to the use of a linear line grating as an encoding system/verification element. As already mentioned hereinbefore however it is also possible, besides a linear line grating, to use further and in particular also two-dimensional gratings. FIG. 10a thus shows a linear line grating 101 and FIGS. 10b to 10f show further line gratings 102 to 106 which can also be used in the embodiments shown in FIGS. 1 to 9b.

Figure 11:
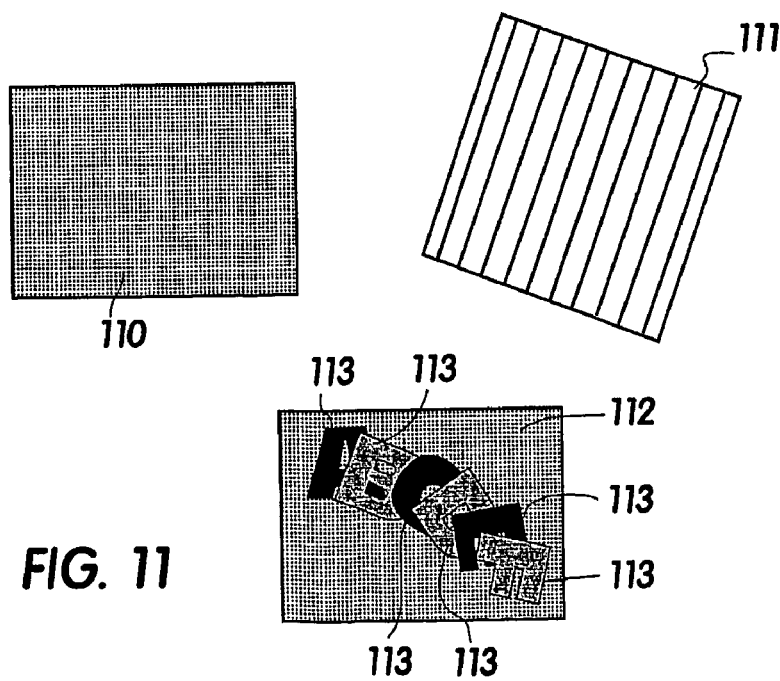
FIG. 11 shows a functional diagrammatic view of a system according to the invention for the visualisation of items of concealed information.

In addition it is also possible to provide in a surface region pattern regions which become visible with different gratings. Thus FIG. 11 shows a surface region 110 in which there are provided various pattern regions 113 which respectively become visible at a given angle of inclination of a verification element 11. If now the verification element 11 is rotated on the surface region 112, that gives the effect of a moving image. If the surface region 112 is viewed without a verification element 111, the impression is that of a homogeneous surface region 110. Pattern regions 113 of that kind can be implemented with the embodiments shown in FIGS. 1 to 9b, in which respect it will be appreciated that it is also possible for different embodiments to be combined together in order here to achieve still further additional colour phenomena and security features which are dependent on the viewing angle.

In addition it is possible to use a verification element whose grating is not identical to that of the parameter variation function. Thus the verification element can have for example a period which corresponds to twice the period or a multiple of the period of the parameter variation function. In addition the verification element can also shape out a hyperbolic pattern of a period corresponding to the period of the parameter variation function.

The above-described security features can be used as stand-alone security features. It is however also possible for those security features to be combined with further security features within a security product. Thus they can be parts of an OVD (optical variable device), for example a Kinegram® or Truststseal® and thus for example form the background of a Kinegram®. It is also possible for the above-described security features to be arranged mosaic-like in an OVD.

What is claimed is:

1. An optical security element comprising: a substrate layer for producing an optically perceptible effect, the substrate layer including a surface region divided into one or more pattern regions and a background region, wherein a relief structure forms a diffraction grating in each of the one or more pattern regions and the background region, a profile of each diffraction grating being defined by relief parameters, the relief parameters including a relief shape, relief depth, spatial frequency and azimuth angle, wherein one or more of the relief parameters of each diffraction grating is varied periodically in accordance with a parameter variation function, wherein the parameter variation function defining the profile in the one or more pattern regions is phase-displaced with respect to the parameter variation function defining the profile in the background region.

2. An optical security element according to claim 1, wherein the phase displacement of the parameter variation function between the pattern region and the background region is about 180 degrees.

3. An optical security element according to claim 1, wherein an azimuth angle of the diffraction grating is varied periodically in accordance with the parameter variation function.

4. An optical security element according to claim 3, wherein a mean of the azimuth angle in relation to the resolution capacity of the human eye is constant.

5. An optical security element according to claim 3, wherein the parameter variation varies the azimuth angle of the diffraction grating periodically in dependence on the value of the an axis extending across at least a portion of the surface region.

6. An optical security element according to claim 5, wherein the parameter variation function varies the azimuth angle of the diffraction grating in such a way that the diffraction grating is composed of a plurality of serpentine line-shaped lines.

7. An optical security element according to claim 6, wherein the parameter variation function is a sine function which varies the azimuth angle of the diffraction grating in dependence on the value of the axis.

8. An optical security element according to claim 3, wherein the parameter variation function varies the azimuth angle of the diffraction grating periodically in dependence on the value of an X-axis and the value of a Y-axis, wherein the X-axis and Y-axis define an extent of the surface region.

9. An optical security element according to claim 8, wherein the parameter variation function varies the azimuth angle of the diffraction grating in such a way that the diffraction grating is composed of a plurality of lines arranged in concentric circles.

10. An optical security element according to claim 3, wherein the diffraction grating has a spatial frequency of more than 300 lines per mm.

11. An optical security element according to claim 1, wherein a special frequency of the diffraction grating is varied periodically in accordance with the parameter variation function.

12. An optical security element according to claim 11, wherein a mean of the spatial frequency in relation to the resolution capacity of the human eye is constant.

13. An optical security element according to claim 11, wherein the parameter variation function varies the spatial frequency periodically between a maximum frequency and a minimum frequency in dependence on the value of the an axis extending across at least a portion of the surface region.

14. An optical security element according to claim 13, wherein the parameter variation function is a sawtooth function, a triangular function or a sine function.

15. An optical security element according to claim 1, wherein a profile depth of the diffraction grating is varied periodically in accordance with the parameter variation function.

16. An optical security element according to claim 15, wherein the parameter variation function varies the profile depth of the diffraction grating periodically between a maximum depth and a minimum depth in dependence on the value of the an axis extending across at least a portion of the surface region.

17. An optical security element according to claim 15, wherein the parameter variation function is a triangular, rectangular or sine function.

18. An optical security element according to claim 1, wherein the relief shape is varied periodically in accordance with the parameter variation function.

19. An optical security element according to claim 18, wherein the relief shape is varied periodically between two asymmetrical, mutually mirror-symmetrical relief shapes.

20. An optical security element according to claim 1, wherein the width of the troughs of the relief structure is varied periodically in accordance with the parameter variation function.

21. An optical security element according to claim 1, wherein the mean azimuth angle of the relief structure respectively corresponds to the azimuth angle of an associated verification grating.

22. An optical security element according to claim 1, wherein the phase displacement between the background region and the pattern region is accompanied by a further function change.

* * * * *